United States Patent [19]

Kamo

[11] Patent Number: 5,465,166
[45] Date of Patent: Nov. 7, 1995

[54] IMAGE READING DEVICE FOR IMAGE RECORDING EQUIPMENT

[75] Inventor: Yasushi Kamo, Yokohama, Japan

[73] Assignee: Ricoh Company, Ltd., Tokyo, Japan

[21] Appl. No.: 209,362

[22] Filed: Mar. 14, 1994

Related U.S. Application Data

[63] Continuation of Ser. No. 13,664, Jan. 28, 1993, abandoned, which is a continuation of Ser. No. 581,732, Sep. 12, 1990, abandoned.

[30] Foreign Application Priority Data

Sep. 12, 1989 [JP] Japan .................................. 1-234687
Aug. 20, 1990 [JP] Japan .................................. 2-217188

[51] Int. Cl.⁶ .................................................. H04N 1/393
[52] U.S. Cl. ........................... 358/451; 358/444; 358/448
[58] Field of Search ..................................... 358/451, 453, 358/443, 444, 448, 452; 382/47

[56] References Cited

U.S. PATENT DOCUMENTS

| | | | |
|---|---|---|---|
| 4,233,636 | 11/1980 | Hanbaugh et al. | 358/451 |
| 4,672,464 | 6/1987 | Shida | 358/444 |
| 4,833,531 | 5/1989 | Abe et al. | 358/451 |
| 4,860,117 | 8/1989 | Sasaki | 358/451 |
| 4,862,285 | 8/1989 | Miyakawa | 358/451 |
| 4,864,413 | 9/1989 | Sasaki | 358/451 |
| 4,864,416 | 9/1989 | Ishikawa | 358/486 |
| 4,872,064 | 10/1989 | Tutt et al. | 358/451 |
| 4,905,096 | 2/1990 | Moriya | 358/453 |
| 4,920,571 | 4/1990 | Abe et al. | 358/451 |
| 4,922,332 | 5/1990 | Taniguchi et al. | 358/451 |
| 4,933,775 | 6/1990 | Shimura | 358/451 |
| 4,943,870 | 7/1990 | Sugishima | 358/451 |
| 4,953,013 | 8/1990 | Tsuji et al. | 358/448 |
| 4,969,051 | 11/1990 | Sasaki | 358/452 |
| 4,980,706 | 12/1990 | Someya | 358/453 |
| 5,008,752 | 4/1991 | Van Nostrand | 358/451 |
| 5,008,760 | 4/1991 | Shimizu et al. | 358/451 |
| 5,033,102 | 7/1991 | Nakajima et al. | 358/453 |
| 5,046,117 | 9/1991 | Yamashita | 358/451 |
| 5,084,760 | 1/1992 | Hashimoto et al. | 358/453 |
| 5,138,670 | 7/1992 | Nakajima et al. | 358/453 |
| 5,162,918 | 11/1992 | Muramatsu | 358/453 |

FOREIGN PATENT DOCUMENTS

| | | |
|---|---|---|
| 0369301 | 5/1990 | European Pat. Off. |
| 3417195 | 11/1984 | Germany |
| 2194116 | 2/1988 | United Kingdom |
| 2226472 | 9/1990 | United Kingdom |

*Primary Examiner*—Edward L. Coles, Sr.
*Assistant Examiner*—Thomas L. Stoll
*Attorney, Agent, or Firm*—Oblon, Spivak, McClelland, Maier & Neustadt

[57] ABSTRACT

An image reading device for use in a digital copier, facsimile transceiver or similar image recording equipment and capable of changing a magnification change ratio. The device performs calculation for interpolation with image data representative of a document image and by using parameters adapted for the calculation. As a result, data representative of an image enlarged or reduced in the main scanning direction are written to a memory.

10 Claims, 16 Drawing Sheets

Fig. 14

| ADDRESS | | VALID OR NOT | r |
|---|---|---|---|
| x x x x | 0 0 0 0 | 0 | 0 |
| ″ | 0 0 0 1 | 0 | $r_1$ |
| | 0 0 0 2 | 0 | $r_2$ |
| | 0 0 0 3 | 0 | $r_3$ |
| ″ | 4 | 1 | 0 |
| | 5 | 0 | $r_4$ |
| | 6 | 0 | $r_5$ |
| | 7 | 0 | $r_6$ |
| | 8 | 1 | 0 |
| | 9 | 0 | $r_7$ |

0 : VALID

1 : INVALID

OLD SAMPLING POINTS

NEW SAMPLING POINTS

| ADDRESS | TO READ OUT OR NOT | r |
|---|---|---|
| $xxxx+0000$ | 0 | $r_0 (=0)$ |
| 1 | 0 | $r_1$ |
| 2 | 0 | $r_2$ |
| 3 | 0 | $r_3$ |
| 4 | 0 | $r_4$ |
| 5 | 1 | $r_5$ |
| 6 | 0 | $r_6$ |

0 : READ OUT
1 : NOT READ OUT

41

42

IMAGE READING DEVICE FOR IMAGE RECORDING EQUIPMENT

This application is a continuation of application Ser. No. 08/013,664, filed on Jan. 28, 1993, now abandoned, which is a continuation of application Ser. No. 07/581,732, filed Sep. 12, 1990, now abandoned.

BACKGROUND OF THE INVENTION

The present invention relates to an image reading device for use in a digital copier, facsimile transceiver or similar image recording equipment and capable of changing a magnification change ratio.

Magnification changing methods heretofore proposed in the past for use with an image reading device may generally be classified into an optical method which changes magnification mechanically by operating optics as in analog image processing, and an electrical method which changes it electrically by processing signals as in digital image processing. It has been customary with the optical method to change magnification in the main scanning direction by changing the length of the optical path of optics and change it in the subscanning direction by changing the speed of a carriage. This kind of method, however, is not applicable to, for example, optics of the type using a cohesion type image sensor. Even in optics using a reduction type image sensor, such a method has critical problems since magnification does not change by noticeable degrees despite the substantial displacements of the mirrors and other optical elements. Specifically, the available range of magnification change ratios is limited, it is difficult to enhance accurate movement of the mirrors and other components, and the position cannot be adjusted with ease. In light of this, a current trend in the imaging art is toward the replacement of the optical method with the electrical method which estimates magnification-changed image data by calculation from image data read from a document. For example, in digital processing of image data, magnification is changed by thinning a pixel signal representative of binary data or by using an interpolation function, i.e., a table for interpolating a pixel signal.

Typical of magnification changing methods based on the conventional magnification changing algorithm are as follows:

(1) nearest pixel substitution method;

(2) interpixel distance linear allocation method; and (3) cubic function convolution method.

Besides the three methods mentioned above, an interpixel distance inversely proportional method and a nearby pixel area allocation method are known in the art which are analogous to the method (2). With any of the three methods, it is necessary to recognize the position of a new sampling point and determine pixel data of old sampling points surrounding the new sampling point as well as the distances thereof to the new sampling point.

The above-stated methods are relatively old practices and have been commonly practiced in the computer image processing art. Although such methods are practicable relatively easily if image data are first stored in a memory and then subjected to magnification change as in computer image processing, various limitations are not avoidable in the case where such processing is executed by hardware without using a memory.

A prerequisite with a digital copier, facsimile transceiver or similar image recording equipment is that, to execute magnification change processing at the time of image reading, image data read by raster scanning be written in by the same mode of raster scanning. Another prerequisite is that a data clock be maintained constant with no regard to the magnification change processing. Specifically, data having undergone magnification change processing has to be outputted in the same format and at the same speed as data having undergone optical magnification change, i.e. in an output mode particular to real-time processing. The situation is somewhat different when magnification change processing is considered in relation to the entire system of equipment such as a digital copier or facsimile machine. For example, if the printing speed of a printer can be changed at the time of recording, the data clock at the time of recording can be changed also. Further, if an image reading device has a large capacity memory and is constructed as a system which stores image data in the memory and then prints them out or transmits them, it is not always necessary for the image data be outputted in the output mode particular to real-time processing. However, the previously mentioned prerequisites have to be met when the image reading device or the magnification change processing section of the image recording equipment is constructed as an independent unit.

On the other hand, even the electrical magnification ratio changing method has a problem that image data is sometimes distorted to lower the accuracy of magnification ratio change, if the method is of the kind changing the magnification by thinning or inserting an image signal as stated earlier. The problem with the conventional interpolation function scheme is that it cannot accommodate optional magnification change ratios, as distinguished from several fixed magnification change ratios, since the table lacks conversion data. Another problem with such a scheme is that even though a table loaded with data on a 1% basis may be used, the magnification change ratio in the same scanning is fixed and cannot be changed and, therefore, the freedom regarding the magnification change is limited.

SUMMARY OF THE INVENTION

It is therefore an object of the present invention to provide an image reading device having a broad range of magnification change ratios and allowing the magnification change ratio to be changed at least in the main scanning direction as desired.

It is another object of the present invention to provide an image reading device capable of setting magnification change ratios accurately in the main scanning direction.

It is another object of the present invention to provide a generally improved image reading device for image recording equipment.

An image reading device of the present invention comprises a photoelectric transducer for reading a document image to convert the document image into an electric image signal, an analog-to-digital converting section for converting the image signal outputted by the photoelectric transducer into digital image data, an interpolation calculating section for enlarging or reducing an output image by applying magnification change processing to the image data by an interpolation function, a magnification change control for controlling the magnification change processing, a digital data combining section for latching a plurality of digital image data necessary for the interpolation calculating means to execute calculation for interpolation, a first store for storing parameters for executing calculation for interpolation which is associated with a set magnification change ratio, and a second store for storing at least one line of digital image data in a main scanning direction. The interpolation calculating section performs calculation with digital image data latched in the digital data combining section and according to the parameters outputted from the first store section thereby outputting digital image data having undergone magnification change processing to the second store.

BRIEF DESCRIPTION OF THE DRAWINGS

FIG. 14 shows a memory table loaded with specific data during reduction processing;

DESCRIPTION OF THE PREFERRED EMBODIMENTS

To better understand the present invention, conventional magnification changing methods applicable to image reading equipment will be described first. The conventional methods may generally be classified into an optical method which changes magnification mechanically by operating optics as in analog image processing, and an electrical method which changes it electrically by processing signals as in digital image processing, as stated earlier.

Figure 1:
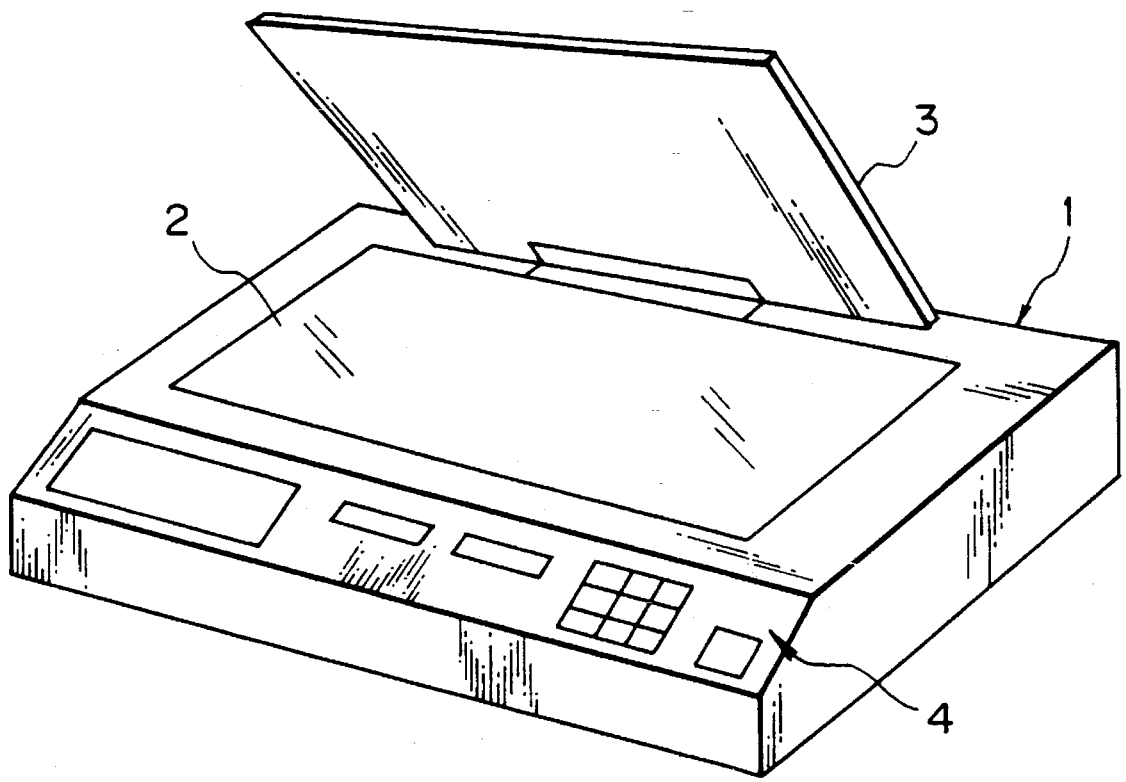
FIG. 1 is a perspective view of a conventional image reading device.

FIG. 1 shows a conventional image reading device which resembles an upper portion of a copier. As shown, the device has a body 1 loaded with a glass platen 2, a cover plate 3, and an operation board 4. After a document has been laid on the glass platen 2, the cover plate 3 is lowered to press the document against the glass platen 2. The operation board 4 is accessible for setting up various functions including read start and density selection. When a start button provided on the operation board 4 is pressed, the device starts reading the document and produces an image signal associated with the document.

Figure 2:
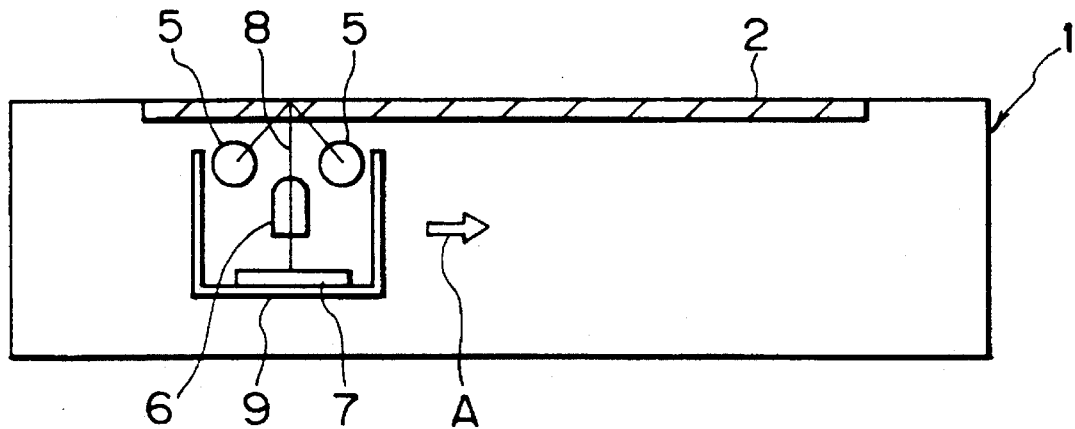
FIGS. 2 and 3 each schematically shows an arrangement incorporated in the image reading device.
Figure 3:
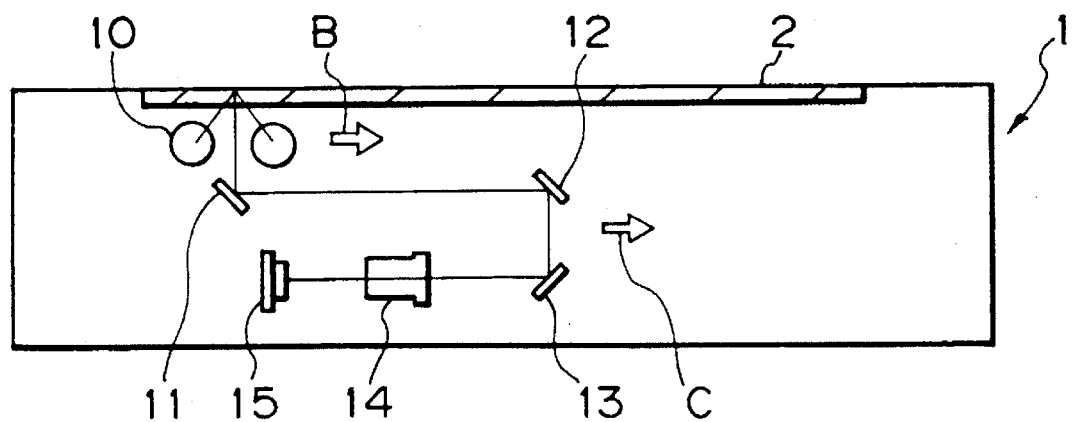

FIGS. 2 and 3 schematically show optics which are incorporated in the image reading device. Specifically, FIG. 2 shows 1:1 optics using a cohesion type image sensor while FIG. 3 shows reduction optics using a reduction type image sensor. In FIG. 2, fluorescent lamps 5 illuminate a document laid on the glass platen 2, and a reflection 8 from the document is incident to an image sensor 7 via a Celhock lens 6. The image sensor 7 has a width equal to or greater than the width of the document (as measured in the direction perpendicular to the sheet surface of FIG. 2), so that it reads one line of image data at a time. The sampling number and sampling pitch per line are dependent on the number of pixels of the image sensor 7. On reading one line of data, the lamps 5, lens 6 and image sensor 7 which are integrally mounted on a carriage 9 are moved in a direction indicated by an arrow A so as to read the next one line. While the interline pitch is determined by the moving speed of the carriage 9, the charge storage time of the image sensor 7, etc., it is usually selected to be equal to the above-mentioned sampling pitch. The direction in which the lines extend (widthwise direction) and the direction in which the carriage 9 moves are generally referred to as a main scanning direction and a subscanning direction, respectively. In FIG. 3, a lens 14 reduces the width of a document image in matching relation to the size of an image sensor 15. First to third mirrors 11, 12 and 13 shown in FIG. 3 are only illustrative and may be replaced with two mirrors or five mirrors, for example. Regarding the main scanning direction, the optics of FIG. 3 read a document in the same manner as the optics of FIG. 2. Regarding the subscanning direction, a carriage 9a loaded with lamps 10 and the first mirror 11 and a carriage 9b loaded with the second and third mirrors 12 and 13 are moved independently of each other in directions B and C, respectively.

It has been customary with the optical magnification changing method to change the magnification in the main scanning direction by changing the length of the optical path of the optics and change it in the subscanning direction by changing the speed of the carriage. This kind of method, however, is not applicable to the optics using a cohesion type image sensor as shown in FIG. 2. Even in the optics using a reduction type image sensor, such a method has critical problems since the magnification does not change by noticeable degrees despite the substantial displacements of the mirrors and other optical components. Specifically, the available range of magnification change ratios is limited, the it is difficult to enhance accurate movement of the mirrors and other components, and the position cannot be adjusted with ease.

A current trend in the imaging art is toward the electrical magnification change method which is free from the problems particular to the optical method as stated above. The electrical method estimates magnification-changed image data by calculation from image data read from a document. For example, in digital processing of image data, the magnification is changed by thinning a pixel signal representative of binary data or by using an interpolation function, i.e. , a table for interpolating a pixel signal.

The electrical magnification changing method heretofore practiced with an image reading device will be described more specifically.

Figure 4:
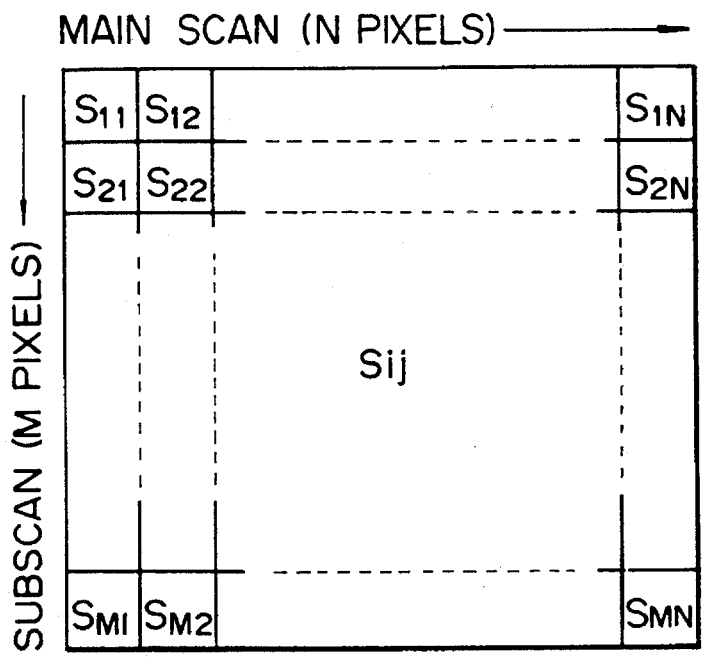
FIG. 4 shows an image data area.

As shown in FIG. 4, an image read by an image reading device is processed by being divided into N×M pixels Sij ($1 \leq i \leq N$, $1 \leq j \leq M$) where N and M are the number of pixels in the main and subscanning directions, respectively. Assuming that the image is changed in magnification by $\alpha\%$, then $N \times \alpha/100$ new data will be obtained.

Typical of magnification changing methods based on the conventional magnification changing algorithm are the previously stated methods (1) to (3). Let the following description concentrate on the magnification change processing in the main scanning direction only. With any of the three methods, it is necessary to recognize the position of a new sampling point and determine pixel data of old sampling points surrounding the new sampling point as well as the distances thereof to the new sampling point.

Figure 5:
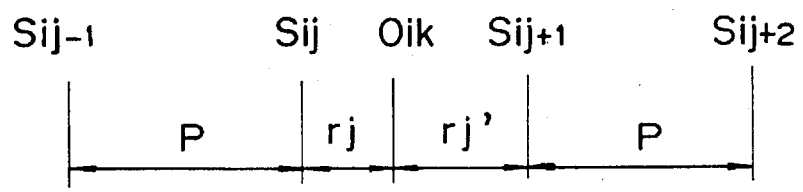
FIG. 5 shows the positions of new and old sampling points which occur during magnification change processing.

FIG. 5 shows old sampling points before magnification change processing and a new sampling point after the processing. As shown, a new sampling point Oik is generally located between old sampling points Sij and Sij+1. Assume that the distances between the new sampling point Oik and the old sampling points Sij and Sij+1 are rj and rj', respectively, and that the old sampling pitch is P.

(1) Nearest Pixel Substitution Method

This method substitutes data sij of the old sampling point Sij nearest to the new sampling point Oik for data oik of the new sampling point Oik. Specifically, if the distance rj is equal to or smaller than rj', the data oik is replaced with the data sij or, if the former is greater than the latter, the data oik is replaced with the data sij+1.

(2) Interpixel Distance Linear Allocation Method

This method allocates the density level of the old sampling point Sij adjacent to the new sampling point Oik on the basis of the distance therebetween and thereby, calculates data of the new sampling point Oik. Specifically, the data oik of the new sampling point Oik is produced by:

$$oik = \{1-(rj/P)\ Sij\} + \{1-(rj'/P)\ Sij+1\} \quad \text{Eq. (1)}$$

(3) Cubic Function Convolution Method

Figure 6:
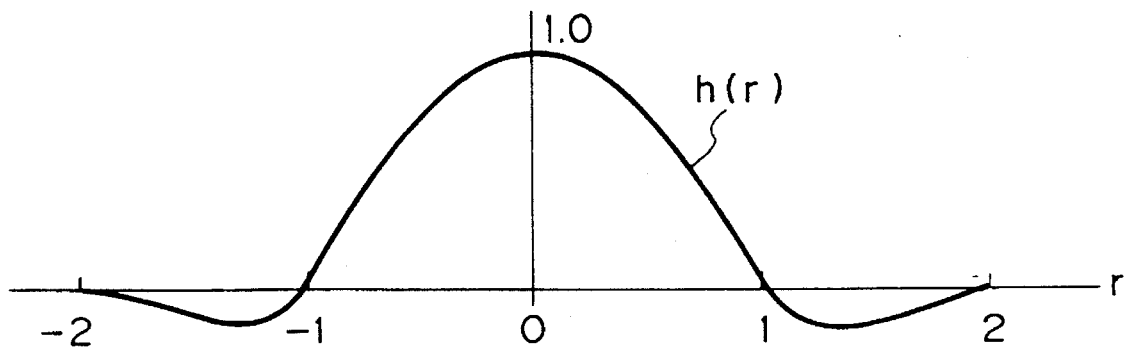
FIG. 6 shows a specific interpolation function.

This method interpolates data of the new sampling point Oik by using an interpolation function h(r) as represented by a curve in FIG. 6 by way of example. The interpolation function h(r) is approximated to r which is standardized by the sampling pitch P, as follows:

if $0 \leq |r| \leq 1$ $$h(r) = 1 - 2|r|^2 + |r|^3 \quad \text{Eq. (2-1)}$$

if $1 \leq |r| \leq 2$ $$h(r) = 4 - 8|r| + 5|r|^2 + |r|^3 \quad \text{Eq. (2-2)}$$

if $2 \leq |r|$ $$h(r) = 0 \quad \text{Eq. (3)}$$

By the interpolation function h(r), the data oik of the new sampling point Oik is determined as:

$$Oik = \{h(1 + rj/P)Sij - 1 + h(rj/P)Sij + \quad \text{Eq. (3)}$$

-continued $$h(rj'/P)Sij + 1 + h(1 + rj'/P)Sij + 2\}/$$

$$\{h(1 + rj/P) + h(rj/P) + h(rj'/P) +$$

$$h(1 + rj'/P)$$

While the previously mentioned interpixel pixel distance inversely proportional method and nearby pixel area allocation method are also available, they are analogous to the method (2) and will not be described specifically.

The methods discussed above are not new in the art and have been practiced with computer image processing in the past. Although such methods are relatively easily practicable if image data is first stored in a memory and then subjected to magnification change as in computer image processing, various limitations are not avoidable in the case where such processing is executed by hardware without using a memory, as stated earlier.

A preferred embodiment of the image reading device in accordance with the present invention will be described hereinafter. Regarding the mechanical arrangement, the illustrative embodiment is similar to the prior art and, therefore, a redundant description will be avoided for simplicity. In the figures, the same or similar components and structural elements are designated by like reference numerals.

Figure 7:
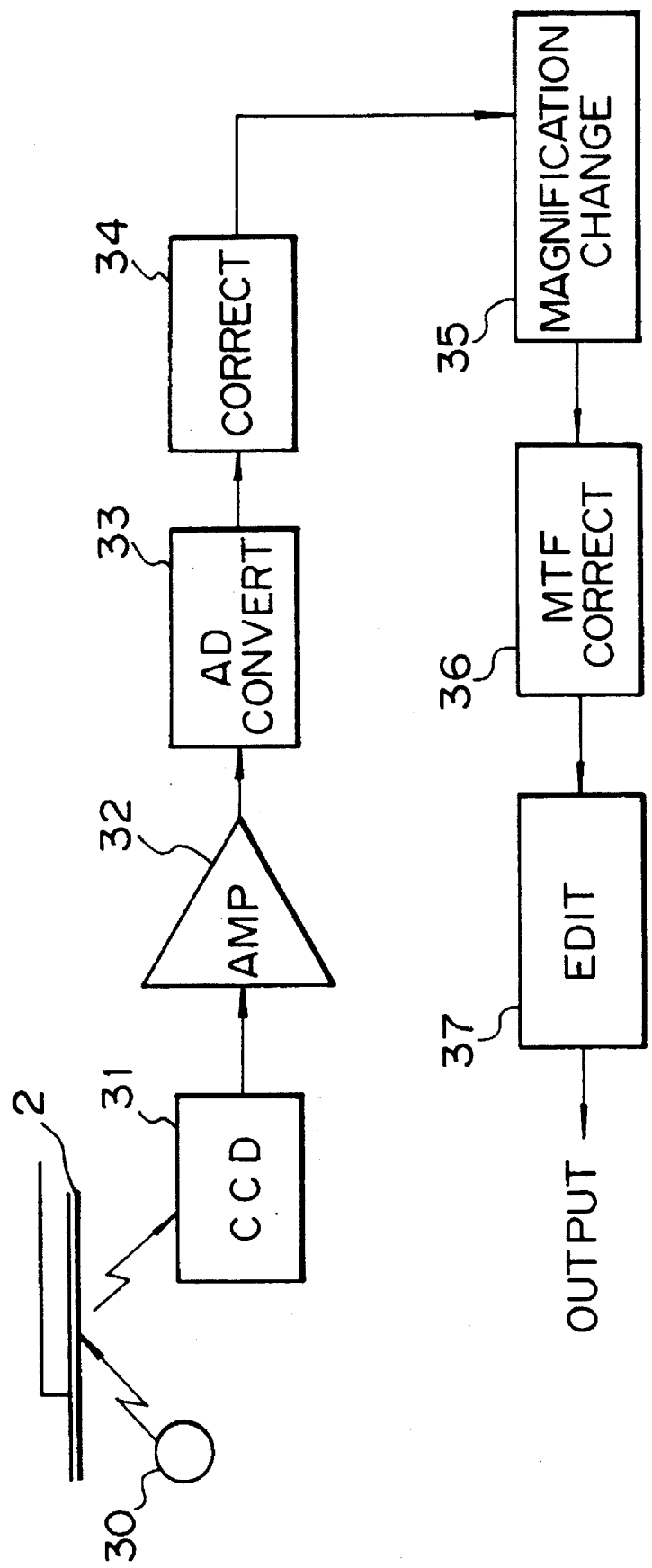
FIG. 7 is a block diagram schematically showing image signal processing circuitry included in an image reading device embodying the present invention.

Referring to FIG. 7, circuitry includes in an image reading device embodying the present invention for processing image signals is shown. The embodiment is assumed to be a combined digital copier and facsimile transceiver. An arrangement is made, therefore, such that the device reads a document of format A3 at a pixel density of 400 dots per inch (or pixels per inch) and at a tone rate of eight bits per pixel (256 tones), subjects the resulting image data to shading correction, MTF correction and other processing, and then convert them into binary digital image data adapted for the printer or for transmission. Specifically, a light source 30 illuminates a document of format A3 from below a glass platen 2. An image sensor 31 reads a reflection from the document by decomposing it into 5000 pixels of optical data in the main scanning direction and at the pixel density of 400 dots per inch (297 millimeters) in the widthwise direction of the document.

An electric signal produced by the image sensor 31 is fed to an amplifying section 32 to be amplified to a predetermined level. The output of the amplifying section 32 is an analog image signal whose voltage level varies with image density. This analog image signal is converted into an 8-bit digital image signal by an analog-to-digital (AD) converting section 33. A shading correction circuit 34 effects shading correction with the output of the AD converting section 33 to compensate for an irregular sensitivity distribution of individual photoelectric transducers constituting the image sensor 31 as well as an irregular intensity distribution of the light source 30 as measured in the widthwise direction of the document.

In the illustrative embodiment, a magnification changing circuit 35 follows the shading correcting circuit 34 for executing magnification change processing. A CPU, not shown, which serves as magnification change control means sends an instruction to the magnification changing circuit 35 in response to magnification change information entered on the operation board 4, FIG. 1, thereby specifying a magnification change ratio. The magnification change processing is followed by MTF correction which is executed by a MTF correcting circuit 36. An editing circuit 27 subjects the output of the MTF correcting circuit 36 to black-white inversion, masking, trimming, etc. The edited data is fed to a printer or similar output unit, not shown, as image data which can be recorded.

It is to be noted that the reading density and the number of tones mentioned above are only illustrative and not limitative. Specifically, the image data transferred to the printer may have tones of four to eight bits (32 to 256 tones) or may be data binarized to "0" or "1". The magnification change processing assigned to the circuit 35 may be executed before the shading processing or after the MTF correction. If desired, the image data may be subjected to dither processing for false halftone representation, in place of the MTF correction.

Figure 8:
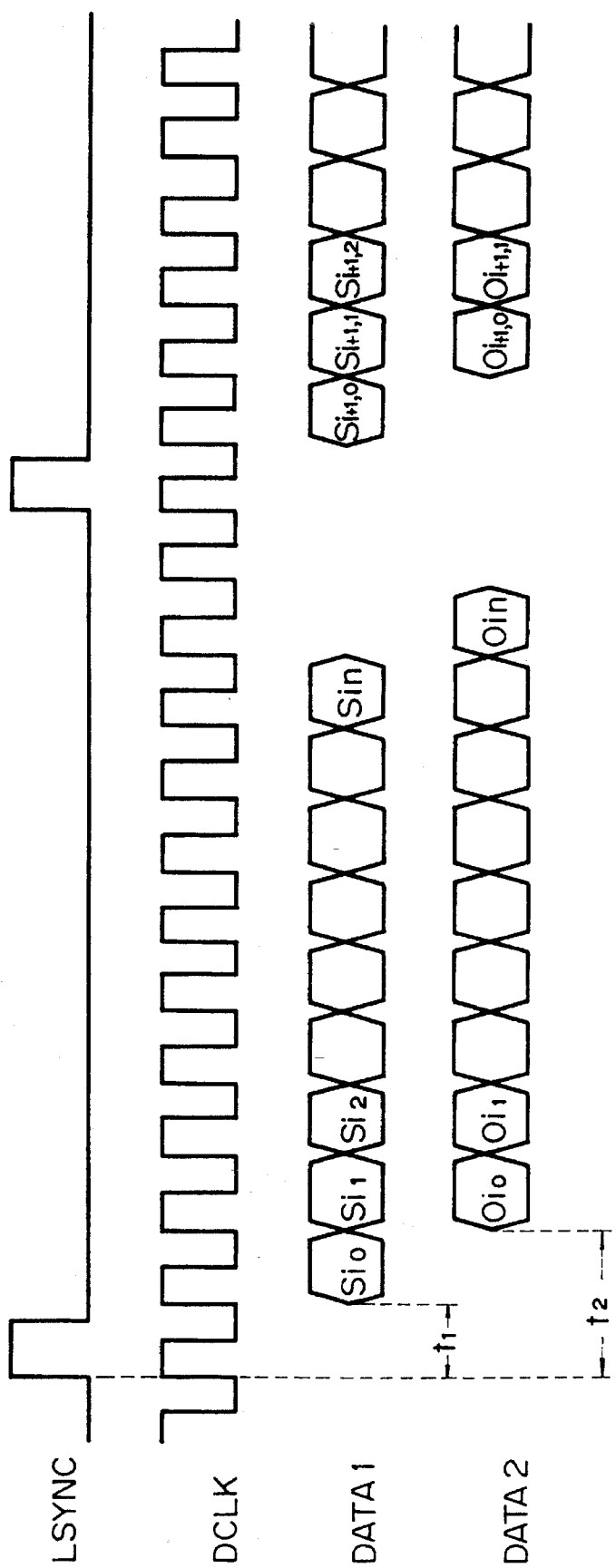
FIGS. 8 and 9 are timing charts indicative of new and old image data.
Figure 9:
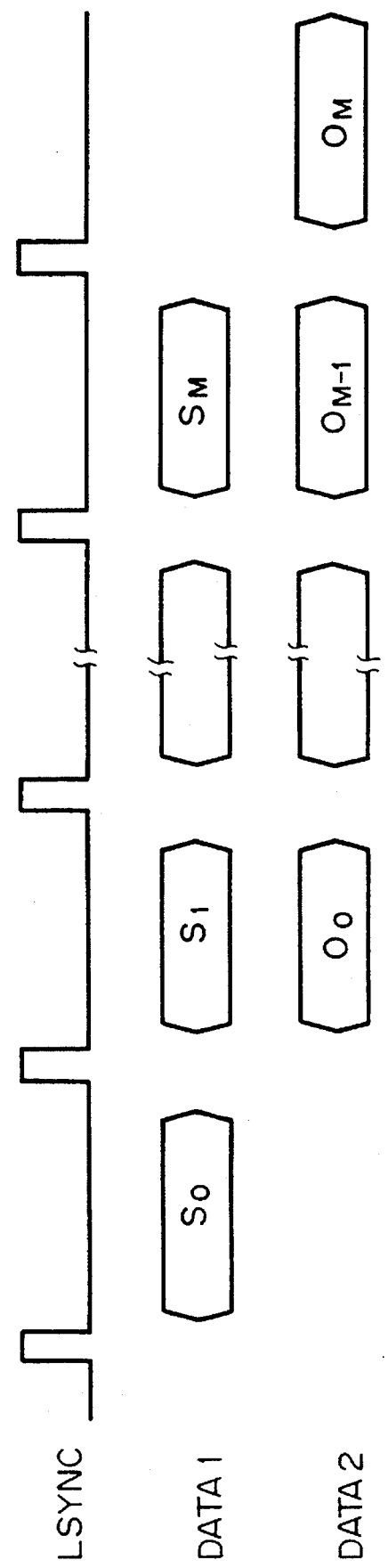

FIGS. 8 and 9 are timing charts showing examples of a timing signal, input image data, and output image data which appear in the magnification change processing executed by the circuit 35. As shown, a horizontal synchronizing signal LSYNC has a period which is the one line read-in or read-out period. A data clock DCLK defines the basic timing of the image reading device. There are also shown in the figures read-in (input) image data DATA1 and read-out (output) image data DATA2.

In FIG. 8, the read-in image data DATA1 is fed to the magnification changing circuit 35 from data sio to data sin in one period of the horizontal synchronizing signal LSYNC and in synchronism with the data clock DCLK. The image data processed by the circuit 35 is outputted as read-out data DATA2. Although the output timing of the read-out image data DATA2 may occur later than the input timing of the read-in image data DATA1, it has to be synchronous with the data clock DCLK. A read-in start time $t_1$ and a read-out start time $t_2$ as counted from the positive-going edge of the signal LSYNC have to be constant at all times. A read-out delay time, $t_2-t_1$, should not change between successive scanning lines, although it is not limited to any particular time.

The output timing of the read-out image data DATA2 may even be delayed by a line relative to the input timing of the read-in image data DATA1, as shown in FIG. 9 specifically. In any case, what is most important and extremely difficult to achieve is synchronizing the image data with the data clock DCLK in the event of input and output of image data.

With modern copiers or similar equipment, there is an increasing demand for a broader magnification changeable range and a so-called zooming capability which implements fractional magnification changes, e.g. on a 1% basis. Even digital copiers and facsimile machines are now required to meet such a demand. While selecting a particular one of several fixed magnifications is relatively easy, changing magnification by fractions as mentioned above is extremely difficult.

The illustrative embodiment is capable of changing magnification on a 1% basis and over a range of 25% to 800%, as will be described.

Figure 10:
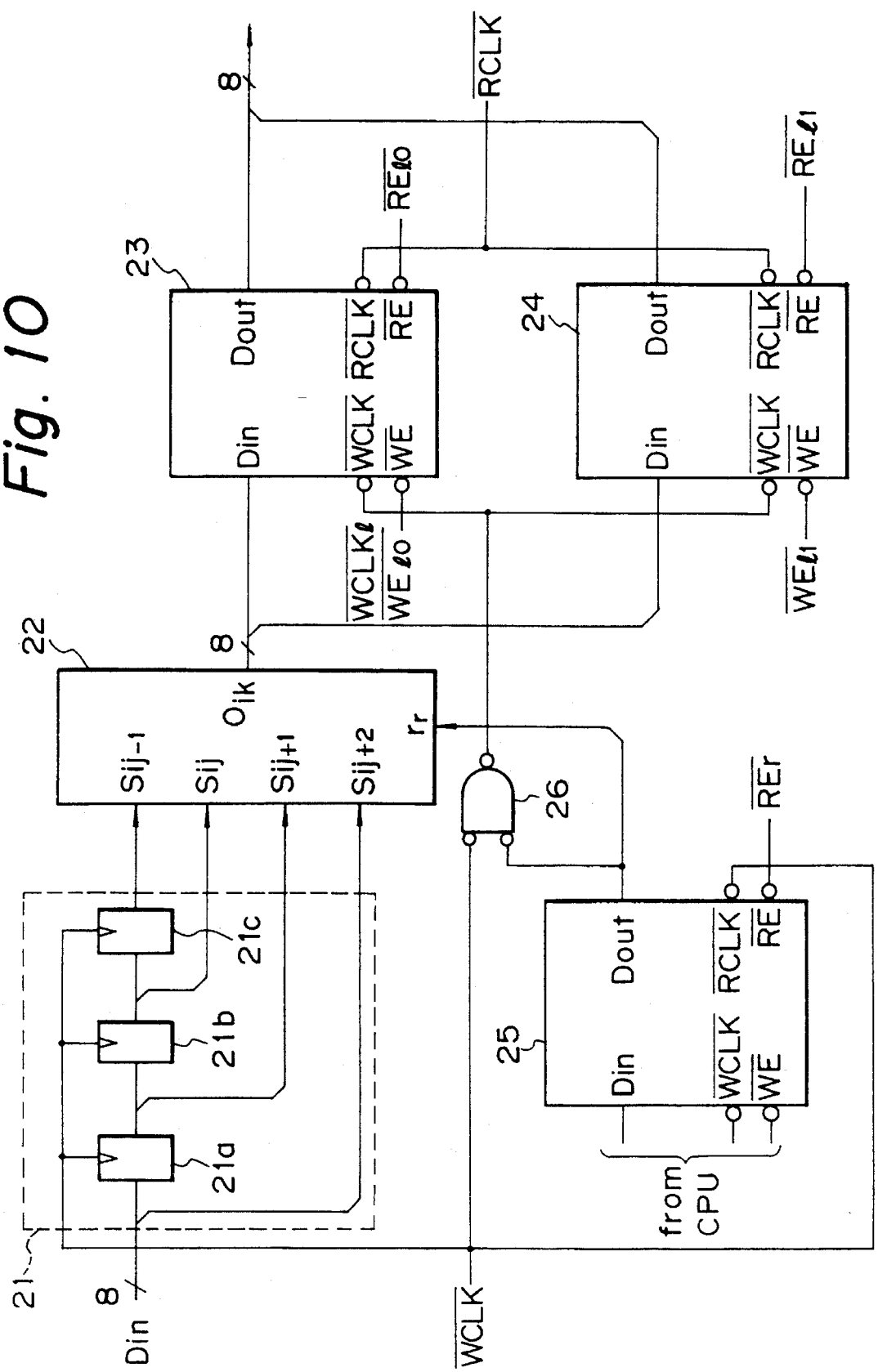
FIG. 10 is a block diagram schematically showing the flow of data in the event of reduction particular to the illustrative embodiment.
Figure 11:
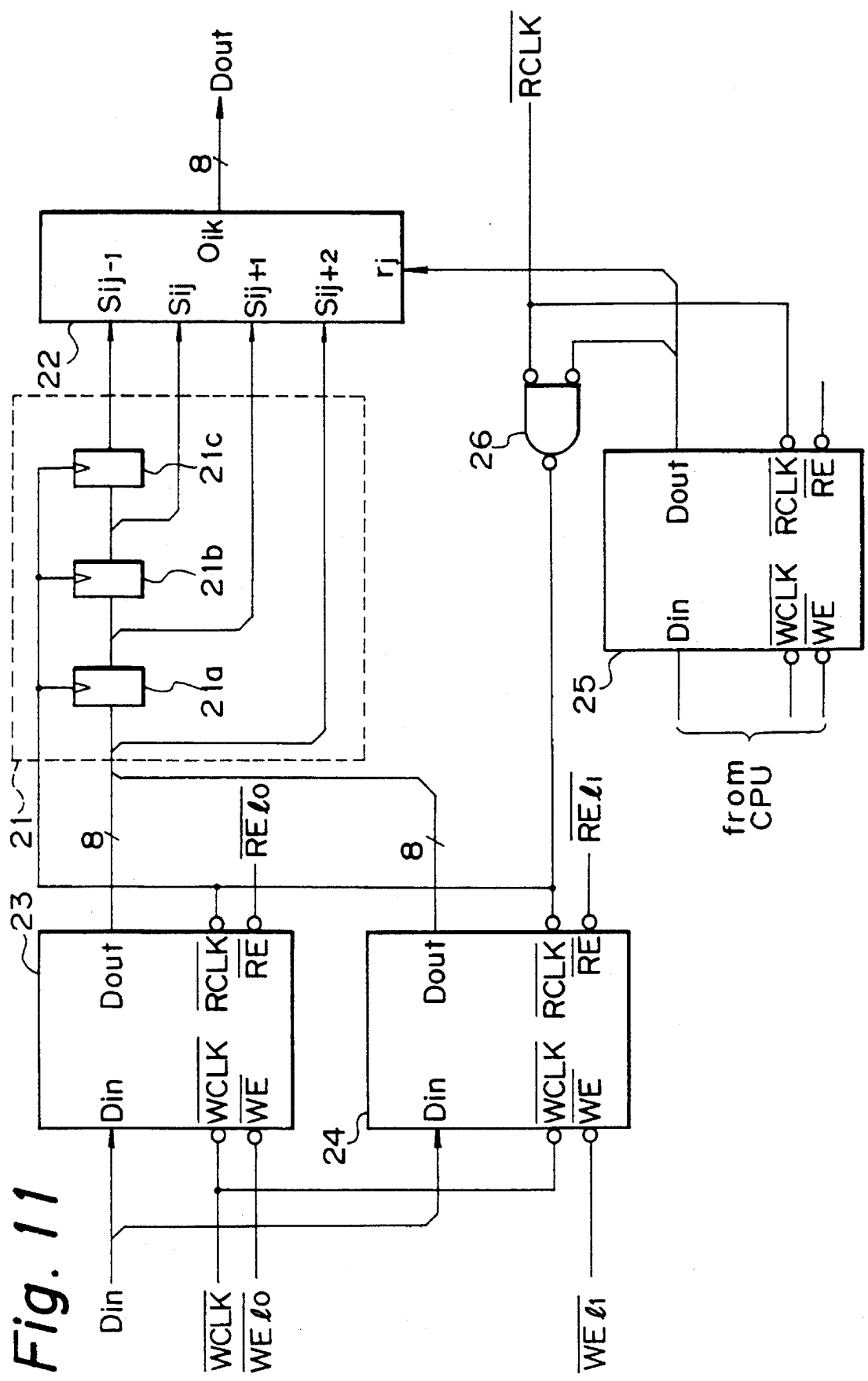
FIG. 11 is block diagram schematically showing the flow of data in the event of enlargement also particular to the embodiment.

FIGS. 10 and 11 show the flow of image data in the magnification changing circuit 35 which occur in the event of reduction and enlargement, respectively. The circuitry shown in FIGS. 10 and 11 both have a function of determining the position of a new sampling point, a function of reading data surrounding a new sampling point, and determining new image data by calculation on the basis of the distances between a new sampling point and old sampling points and old image data.

Figure 12:
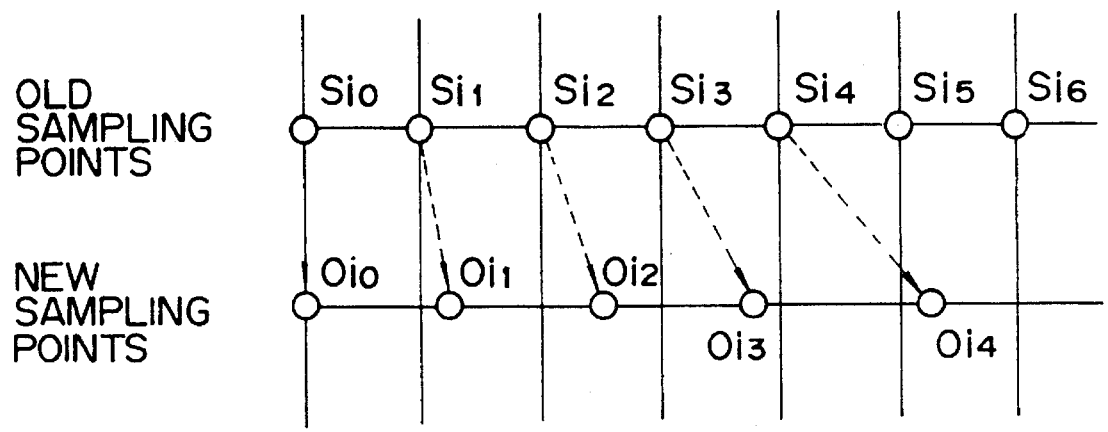
FIG. 12 shows the positions of new and old sampling points which occur during reduction processing.

How new image data is calculated in the event of reduction will be described with reference to FIG. 10 and FIG. 12 which indicates the positions of new and old sampling points. New sampling points Oik are deviated from old sampling points Sij such that their distance sequentially increases. Specifically, as shown in FIG. 12, a new sampling point Oi1 is located between old sampling points Si1 and Si2, a new sampling point Oi2 is located between old sampling points Si2 and Si3, and a new sampling point Oi3 is located between old sampling points Si3 and Si4. New data oi1 at the new sampling point Oi1 is produced by the previously stated interpolation on the basis of data si0, Si1, si2 and si3 of four pixels surrounding old sampling points Si0, Si1, Si2 and Si3 and the distance r1 between the points Oi1 and Si1. Likewise, new data oi2 at the new sampling point Oi2 is produced on the basis of data si1, si2, si3 and si4 at old sampling points Si1, Si2, Si3 and Si4 and the distance r2 to the sampling point Si2. New data oi3 at the new sampling point Oi3 is obtained on the basis of data si2, si3, si4 and si5 at old sampling points Si2, Si3, Si4 and Si5 and the distance r3 to the old sampling point Si3. The new sampling point Oi4 is located between old sampling points Si5 and Si6, and new data oi4 is obtained on the basis of old data si4, si5, si6 and si7 and the distance r4 to the old sampling point Si5. More specifically, new sampling point does not exist between the points Si4 and Si5, i.e., new data does not exist in spite of the combination of old data si3, si4, si5 and si6.

Such a reduction procedure will be described more specifically with reference to FIG. 10. As shown, 8-bit image data is applied to a data combining section (combining means) 21 which has three consecutive latches 21a, 21b and 22c. Then, the latches 21a to 22c combine the input image data into a group of four consecutive pixels of image data. These data are applied in parallel to an interpolation calculating section (interpolation calculating means) 22. This section 22 performs interpolating operations with the four sets of pixel data {sij} and the distance rj between the new and old sampling points and writes the resulting new pixel data {oik} to a line memory 23 or 24. Each of line memories 23 and 24 has a capacity which accommodates one line of image data in the main scanning direction. When use is made of a RAM (Random Access Memory) having common input and output ports, an address generating circuit will be associated with line memories 23 and 24. Line memories 23 and 24 are arranged in two parallel stages (two lines) so as to perform reading and writing every line. Specifically, assuming that image data produced by reading one line of data and interpolated is written to the line memory 23, the line memory 24 is exclusively used to read out image data stored therein. This relation between the line memories 23 and 24 will be inverted at the next line. To simplify the circuit construction, the line memories 23 and 24 may advantageously be implemented as FIFO (First-In First-Out) memories.

To begin with, when the data combining section 21 is filled with old pixel data si0, si1, si2 and si3, new pixel data oi1 is produced on the basis of the four pixel data and the distance r1 to the old sampling point Si1. Then, a write clock $\overline{WCLK}$ and an output of a memory 25 are individually inverted and applied to a NAND gate 26. In response to the resultant output $\overline{WCLK1}$ of the NAND gate 26, the new pixel data oi1 is written to the line memory 23 or 24. Thereupon, old pixel data si1, si2, si3 and si4 are latched in the data combining section 21 in response to the signal $\overline{WCLK1}$, whereby new data oi2 of the new sampling point Oi2 is obtained. Subsequently, old pixel data si2, si3, si4 and sis are latched in the data combining section 21 to produce new pixel data oi3. In the same manner, old pixel data si3, si4, si5 and si6 are latched in the data combining section 21 while the interpolating operations are performed by the calculating section 22. However, since no new sampling points exist between the old sampling points Si4 and Si5 and, therefore, no new data are obtainable with the old pixel data si3, si4, si5 and si6, the value produced by the interpolation is meaningless and, therefore, not written to the line line memory 23 or 24. Data obtained with the next old sampling points Si4, Si5, Si6 and Si7 is written to the line memory 23 or 24 as new pixel data of the new sampling point Oi4.

The distances rj between the new and old sampling points adapted for interpolation and information associated with the validity of the result of operation (whether or not to write the result of operation to the line memory 23 or 24) are calculated beforehand and stored in the memory 25.

Figure 13:
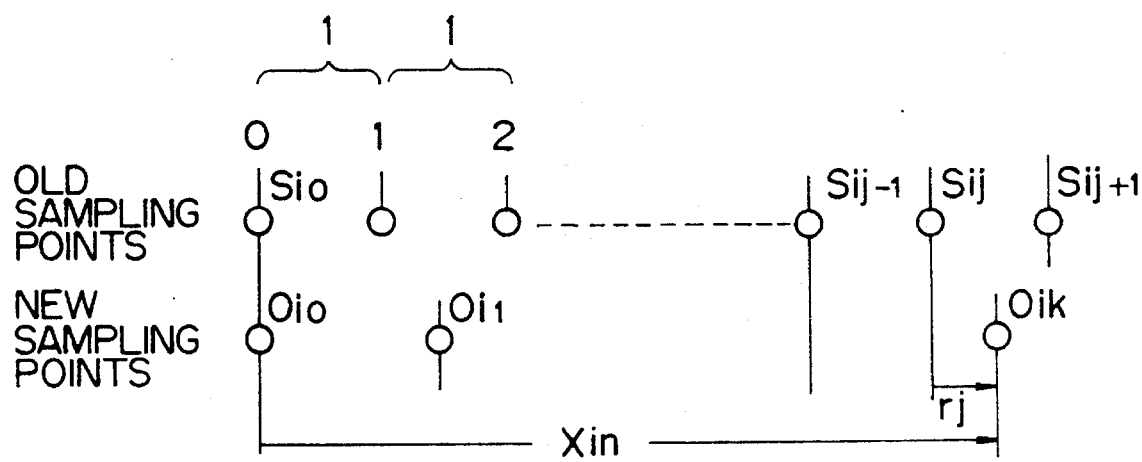
FIG. 13 shows the positions of new and old sampling point which occur during enlargement processing.

Assume that the new sampling point Oik is a position xin, the starting position is 0, and the old sampling pitch is 1. Then, as shown in FIG. 13, when the new sampling point Oik is located between the old sampling points Sij and Sij+1, there hold the following relations:

(integral portion of xin)=j (fractional portion of xin)=rj where rj is the distance between the new sampling point Oik and the old sampling point Sij.

Table 1 shown below shows specific results of calculation for the sake of description.

TABLE 1

| ADDRESS NO. | 0 | 1 | 2 | 3 | 4 | 5 | 6 | 7 | ... |
|---|---|---|---|---|---|---|---|---|---|
| INTEGRAL PORTION OF xin (j) | 0 | 1 | 2 | 3 | 5 | 6 | 7 | 9 | ... |
| FRACTIONAL PORTION OF xin (r) | 0 | $r_1$ | $r_2$ | $r_3$ | $r_4$ | $r_5$ | $r_6$ | $r_7$ | ... |

The image data written to the line memory 23 or 24 are sequentially read out by a read clock $\overline{RCLK}$ in the order of write-in (Oi0, Oi1, Oi2, ... ) and fed to other image processing sections of the device (MTT correction, black-white inversion, etc.)

Figures 15, 16:
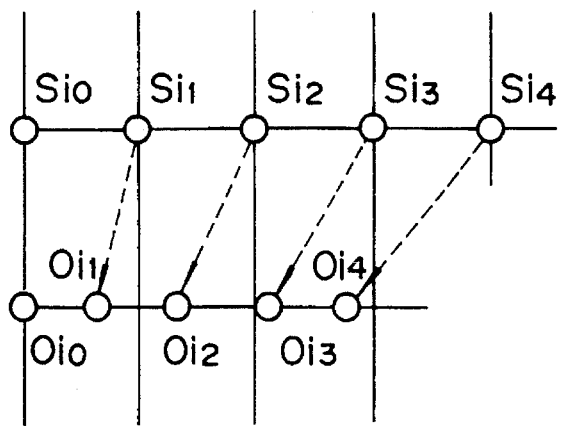
FIG. 15 shows the positions of new and old sampling points occurring during enlargement processing.
FIG. 16 shows a memory table loaded with specific data during enlargement processing.

How new data is calculated in the event of enlargement will be described with reference to FIG. 11 and FIG. 15 which shows the positions of new and old sampling points. In the event of enlargement, new sampling points Oik are deviated from old sampling points Sij such that their distance sequentially decreases. Specifically, as shown in FIG. 15, a new sampling point Oi1 is located between old sampling points Si0 and Si1, and new pixel data oi0 is determined by the interpolation of four pixels around the point Oi1 on the basis of pixel data si0, si1, si2 and 0 (all the pixel data outside of si0 are determined to be 0) and the distance r1 between the new and old sampling points. A new sampling point Oi2 intervenes between old sampling points Si1 and Si2, and new pixel data oi2 is determined on the basis of old data si0, si1, si2 and si3 and the distance r2 between the new and old sampling points. New sampling points Oi3 and Oi4 both are located between old sampling points Si2 and Si3, so that new pixel data oi3 and oi4 are obtained on the basis of old data si1, si2, si3 and si4 and the distances r3 and r4 between the new and old sampling points.

The above situation will be described more specifically with reference to FIG. 11. 8-bit image data are written to the line memory 23 or 24 in the same order as the sampling order, i.e. si0, si1, si2, ... . The relation between the line memories 23 and 24 with respect to the writing and reading operations is the same as in the case of reduction. After one line of sampling data {sij} have been written to the line memory 23 or 24, a reading operation begins. In response to a read clock $\overline{RCLK}$, the one line of image data are sequentially read out of the line memory 23 or 24 in the writing order, i.e. in the order of image data si0, si1, si2, ... The data combining section 21 latches, among the image data read out, four image data (0, si0, si1 and si2) and feeds them to the interpolation calculating section 22. Then, the section 22 calculates new pixel data oi1 by using the four pixel data (0, si0, si1 and si2) and the distance r1 between the new and old sampling points.

In response to the next $\overline{RCLK}$, the old pixel data sis is read out of the line memory 23 or 24 with the result that the data combining section 21 latches old image data si0, si1, si2 and si3. By using these four data, the calculating section 22 determines new pixel data oi2. In response to the subsequent clock $\overline{RCLK}$, old image data si4 is read out of the line memory 23 or 24. The calculating section 22, therefore, produces new pixel data oi3 by using old pixel data si1, si2, si2 and si4 latched in the data combining section 21 and the distance r3 between the new and old sampling points. Since new pixel data oi4 is produced from old pixel data si1, si2, si3 and si4 and the distance r4 between the new and old sampling points, data are not read out of the line memory 23 or 24 and the data combining section 21 does not shift data therein in the event of calculation of the new pixel data oi4.

The output image data oi1, oi2, oi3 and oi4 from the calculating section 22 are delivered to the other image processing sections of the device (MTF correcting circuit and the like). Again, the distances rj between new and old sampling points adapted for interpolation and information indicative of whether or not to read old data out of the line memory 23 or 24 are calculated beforehand and stored in the memory 25.

Assume that the position of a new sampling point Oin is Xin, the start position is 0, and the old sampling pitch P is 1, as has been the case with reduction. Then, when the new sampling point Oin is located between old sampling points Sij and Sij+1, there hold relations:

(integral part of xin)=j (fractional part of xin)=rj

Table 2 shown below indicates specific results of operation.

TABLE 2

| ADDRESS NO. | 0 | 1 | 2 | 3 | 4 | 5 | 6 | ... | ... |
|---|---|---|---|---|---|---|---|---|---|
| INTEGRAL PORTION OF xin (j) | 0 | 0 | 1 | 2 | 3 | 3 | 4 | ... | ... |
| FRACTIONAL PORTION OF xin (r) | 0 | $r_1$ | $r_2$ | $r_3$ | $r_4$ | $r_5$ | $r_6$ | ... | ... |

In such a case, the memory 25 is loaded with data as represented by a memory table in FIG. 16, and these data are read out in response to the read clock RCLK.

The position xin is expressed, in both of enlargement and reduction, by:

$$xin = \sum_{k=1}^{n} d_k$$

Figure 17:
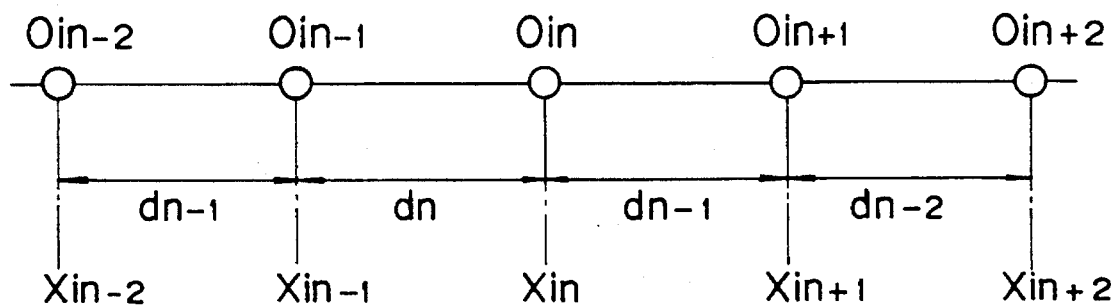
FIG. 17 shows the positions of new sampling points.
Figure 18:
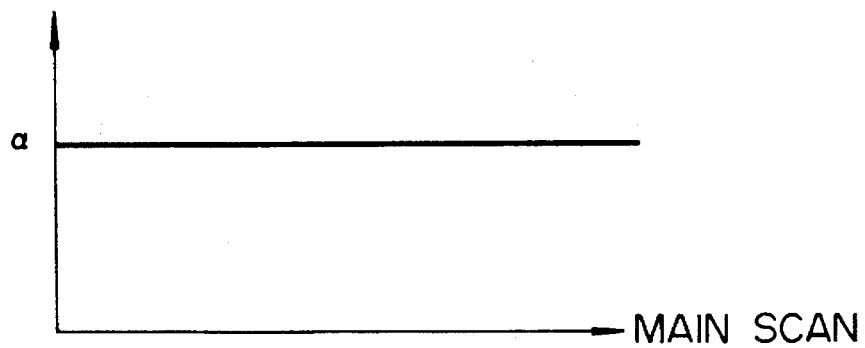
FIGS. 18 to 20 each shows particular setting of magnification change ratios in the main scanning direction.

As a result, the positions xin of new sampling points Oin and the new sampling pitches dn are related as shown in FIG. 17. For example, assume that the magnification change ratio has a constant value α (%), as shown in FIG. 18. Then, $d_k$ is 100/α. Therefore, $$xin = (100/\alpha) \times n \quad \text{Eq. (4)}$$

Especially, when α is 100, meaning 1:1 processing, $d_k$ is 1 and, therefore, $$xin = n$$

Figure 19:
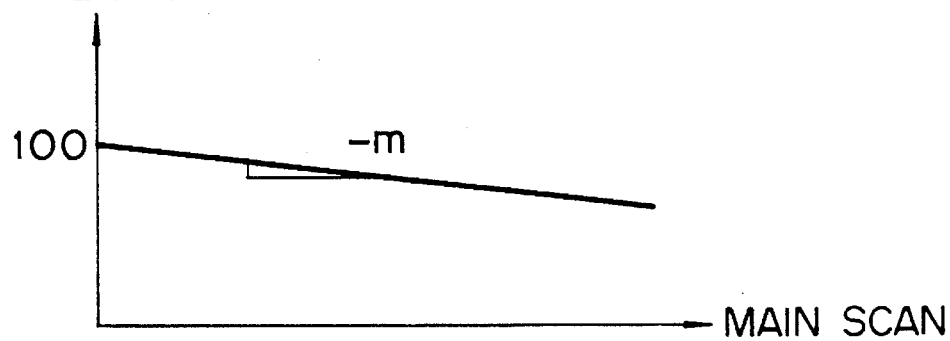

On the other hand, assume that the magnification change ratio is 100% when n is 0 and sequentially decreases with the increase in n, as shown in FIG. 19 (line having a gradient −m (%)). Then, $d_k$ is 100/(100−k.m) and, therefore, $$xin = \sum_{k=1}^{n} \frac{100}{100 - m \cdot k} \quad \text{Eq. (5)}$$

Figure 20:
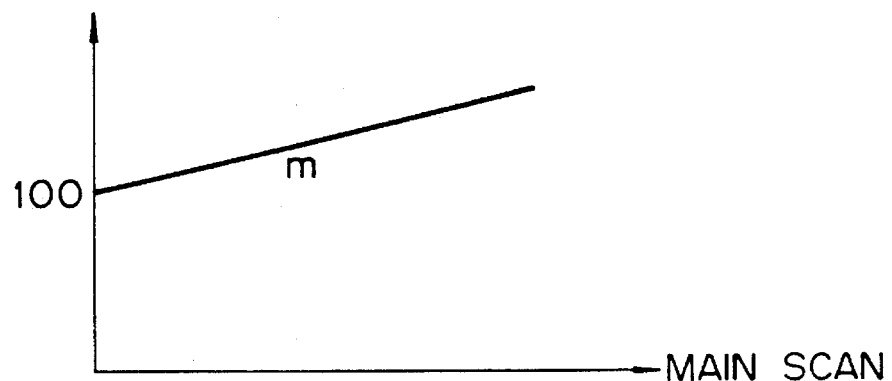

Further, assume that the magnification change ratio is 100% when n is 0 and sequentially increases with the increase in n, as shown in FIG. 20 (line having a gradient m (%)). Then, $d_k$ is 100/(100+k.m) and, therefore, $$xin = \sum_{k=1}^{n} \frac{100}{100 + m \cdot k} \quad \text{Eq. (6)}$$

The CPU calculates the positions xin of n=0, 1, 2, . . . by using the above equations, picks up the integral and fractional portions of the results of calculation to determine j and rj, and writes to the memory 25 whether or not to write the results of interpolating calculation to the line memory 23 or 24 (in the event of reduction) or whether or not to read sampling data out of the line memory 23 or 24 (in the event of enlargement) and the distances rj. The memory 25 has a capacity capable of accommodating at least

[(number of pixels per line)×(number of bits representative of rj+1)] bits.

The memory 25, like the line memories 23 and 24, may be implemented as a FIFO memory in order to write and read data sequentially in one address at a time.

When the positions xin of new sampling points Oin are calculated by use of the Eq. (4), magnification will be changed by predetermined ratios. In contrast, when the function for determining the positions xin is defined in various ways such as represented by the Eqs. (5) and (6), it is possible to change the magnification change ratios within the same main scanning. The memory 25 to be loaded with the distances r and other data may also be arranged in two parallel stages, in which case the two stages will be used for writing and reading alternately to change the magnification ratios in the main scanning direction.

Hereinafter will be described a magnification change ratio inputting device which is operable to input magnification change information in the main scanning direction by use of a digitizer tablet.

Figure 21:
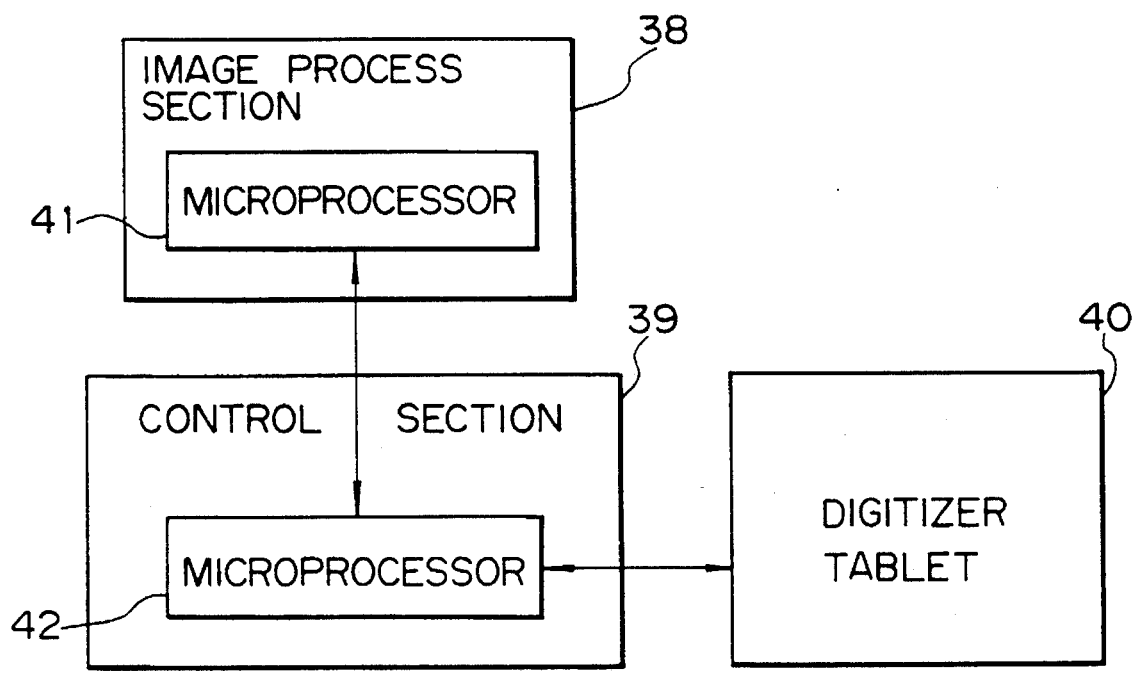
FIG. 21 is a block diagram schematically showing an image reading device and a digitizer tablet connected to each other.

FIG. 21 shows an image forming device and a digitizer tablet connected to each other. The image reading device has an image processing section 38 and a control section 39 which have microprocessors 41 and 42, respectively. The digitizer tablet 40 and the microprocessor 42 and the microprocessors 41 and 42 themselves are interconnected by serial communicating means each. In this configuration, the digitizer tablet 40 feeds address (X/Y) information entered by an operator to the control section 39, while the control section 39 feeds signals to the tablet 40 for turning on and off LEDs (Light Emitting Diodes) and a buzzer provided on the tablet 40.

Figure 22:
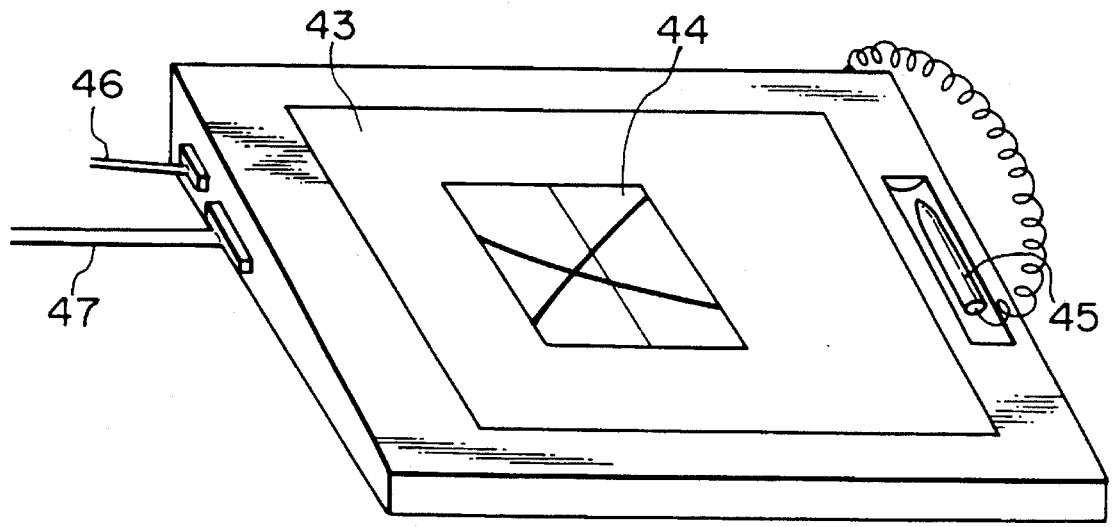
FIG. 22 is an external perspective view of the digitizer tablet.

FIG. 22 shows a specific construction of the digitizer tablet 40. As shown, the tablet 40 has a digitizing sheet 43 for reading inputted coordinates, X/Y coordinates axes 44 printed on the digitizing sheet 43 for inputting a magnification change ratio in the main scanning direction, a stylus pen 45 which allows the operator to enter position information, an AC power supply adapter 46, and a cable implementing the communication of the tablet 40 with the control section 39. Magnification change ratio information associated with addresses which are designated by the stylus pen 45 is converted address by address into a voltage value. The voltage values are converted into digital data by a signal processing circuit incorporated in the digitizer tablet 40 and then transmitted to the control section 39 as digital address data. The control section 39 stores such image data in a local memory included in the microprocessor 42 and executes address interpolate processing as needed. This is because the resolution available with the digitizer tablet 40 is generally lower than the resolution of the image reading device 1, FIG. 1. When a magnification change ratio in the main scanning direction is determined by interpolation and other processing, the magnification change ratio information is sent to the microprocessor 41 of the image processing section 38. As a result, image data read by the image reading device 1 are changed in magnification on the basis of the determined magnification change ratio.

If desired, the microprocessors 41 and 42 may be integrated to control the apparatus body and execute image processing in combination. Any desired communication mode and protocol may be selected so long as they implement a transfer rate higher than a certain transfer rate (4800 bits per second). Furthermore, the operator may designate only representative points on the digitizing sheet 43 instead of drawing a figure on the sheet 43, in which case the magnification will be set by interpolation by the microprocessor 42 over the entire area.

Figure 23:
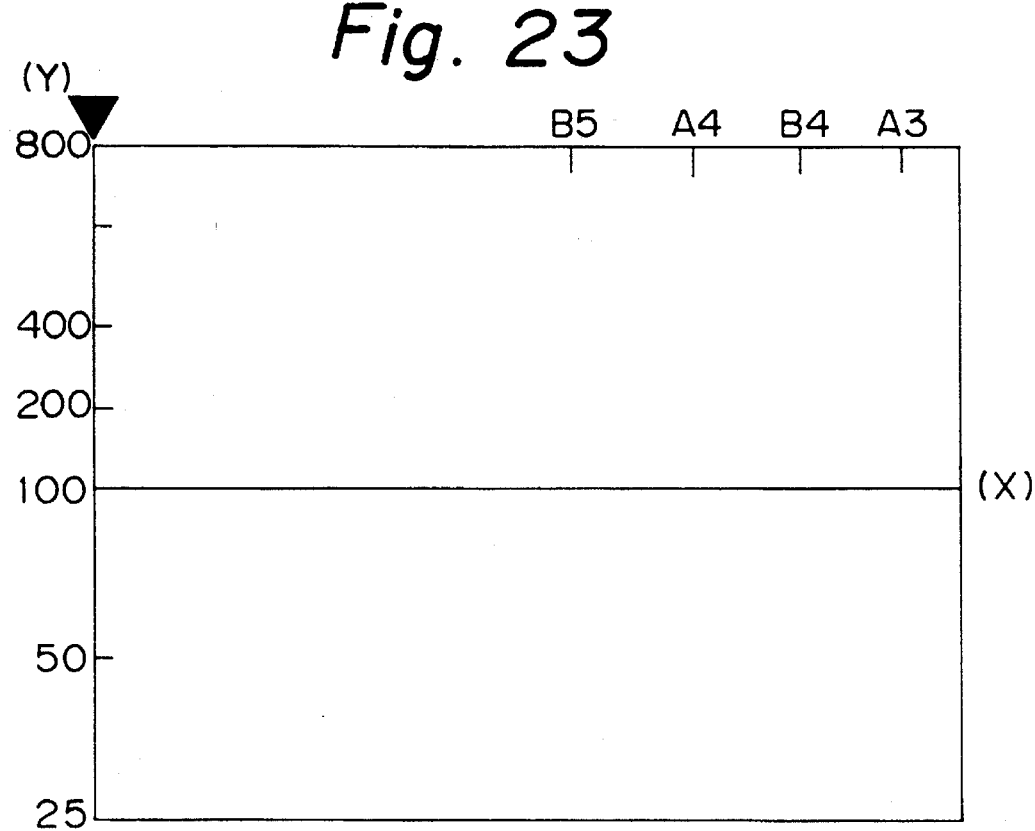
FIG. 23 shows an example of X/Y coordinates for entering magnification change ratios.

FIG. 23 shows specific X/Y coordinates which may be used to input magnification change ratios. In the figure, the abscissa (X) and the ordinate (Y) are respectively representative of the distance as measured in the main scanning direction and the magnification change ratio. A mark in the form of an inverted triangle is provided on the ordinate while labels such as B5, A4 and B4 are provided on the upper edge parallel to the abscissa, indicating the left edge of a document and the standard positions in the main scanning direction. The mark and labels are useful when the scales on the coordinates axes are not full-scale. The abscissa is so printed as to intersect the ordinate at the 1:1 (100%) magnification position. Essential numerical values representative of enlargement and reduction ratios are provided in a logarithmic form along the ordinate.

Figure 24:
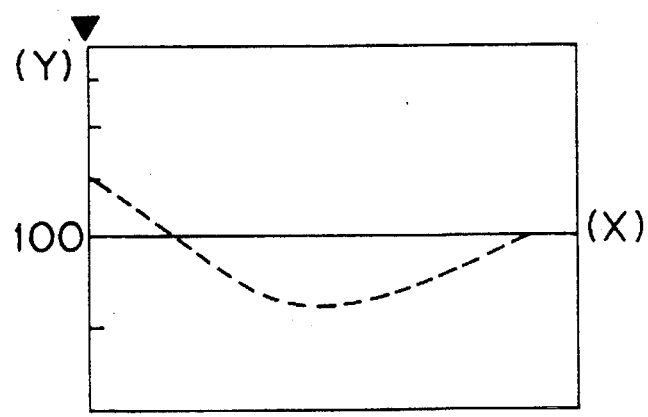
FIG. 24 shows specific magnification change ratios which are entered on a digitizing sheet.

FIG. 24 shows specific magnification changes ratios in the main scanning direction which were entered on the digitizing sheet 43 by use of the stylus pen 45. As indicated by a dashed line in the figure, the desired magnification is such that it begins with doubling at the left edge of a document, sequentially decreases, changes from enlargement to reduction, reaches the maximum reduction ratio, sequentially decreases the reduction ratio, and then reaches 1:1 magnification.

As stated above, with the digitizer tablet 40, it is possible to enter desired magnifications in the main scanning direction in order to achieve a processed image undergone local magnification change. This will be described specifically with reference to FIGS. 24, 26 and 27.

Figure 25:
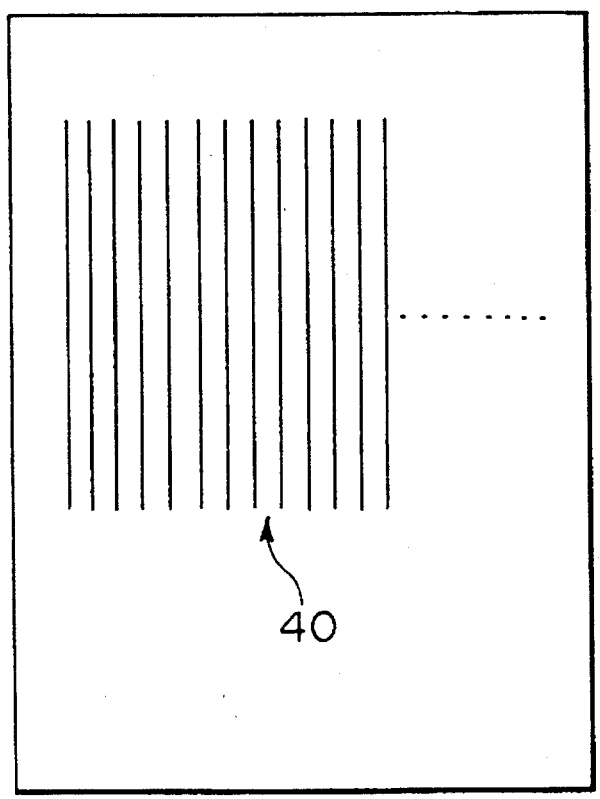
FIGS. 25 to 27 show specific images each being printed out on the basis of entered magnification change ratios.
Figure 26:
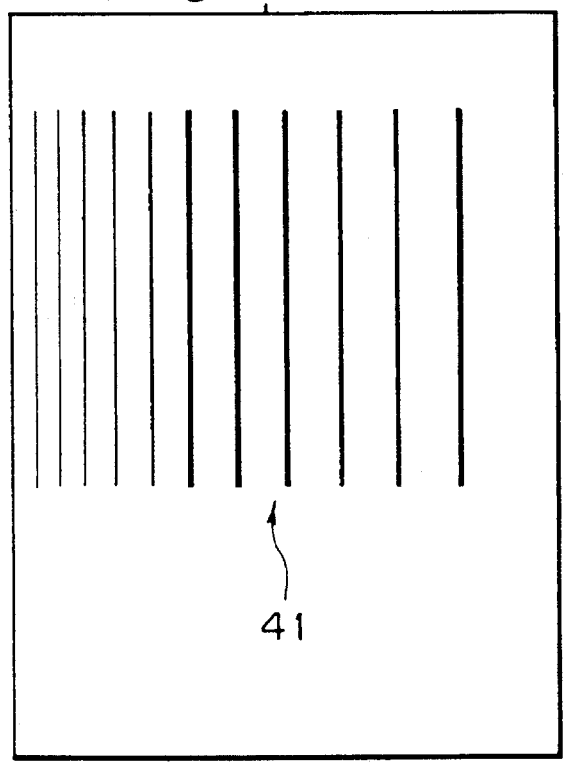
Figure 27:
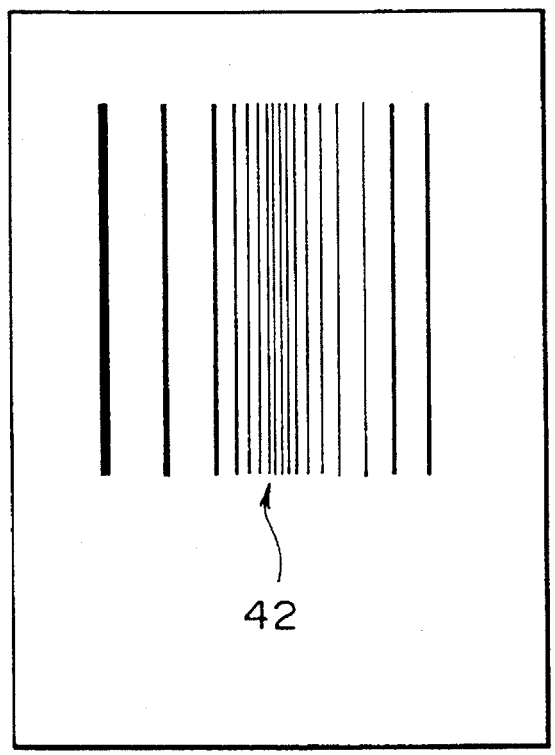

FIG. 25 shows a specific original document on which a number of parallel lines 40 are printed. FIGS. 26 and 27 show respectively bar codes 41 and 42 which are obtainable with the document image 40 by using the magnification change ratios shown in FIGS. 20 and 24, respectively. It will be seen that by setting and inputting magnification change ratios suitably in the main scanning direction, it is possible to produce bar codes having a desired configuration with ease.

As described above, the illustrative embodiment is capable of changing the magnification change ratio in the main scanning direction over a broad and desired range and, therefore, creating an image which is enlarged or reduced in the main scanning direction. Such an image is not attainable with conventional copiers or similar equipment. It is also possible with the illustrative embodiment to perform unprecedented image conversion such as the conversion of an equidistant graph into a logarithmic graph.

In summary, it will be seen that the present invention provides an image reading device which allows magnification to be changed over a broad range and by any desired ratios at least in the main scanning direction. Moreover, the image reading device allows the magnification to be changed the main scanning range with simple circuitry and accurate operations.

Various modifications will become possible for those skilled in the art after receiving the teachings of the present invention without departing from the scope thereof.

What is claimed is:

1. Image forming equipment having magnification changing means for executing magnification changing processing with input data in response to an input magnification change ratio, said equipment comprising:

first and second line memories for outputting data corresponding to an image to be reproduced;

magnification change ratio inputting means for inputting a magnification change ratio which is variable in a main scanning direction;

CPU means for receiving said magnification change ratio and for outputting data corresponding to said magnification change ratio;

a NAND gate for receiving, at first and second inputs thereof, a write clock signal and an output of a first storing means in order to control the timing of data output by said first and second line memories;

first storing means for receiving said data output by the CPU means, storing predetermined data corresponding to magnification ratios represented by vectors offset from pixel locations of a document to be copied in order to determine locations of shifted pixels in the output image, said first storing means outputting said predetermined data; and interpolation calculating means for generating an enlarged or reduced output image according to the predetermined data output by said first storing means by interpolating the predetermined data;

whereby image data are outputted with a variable magnification change ratio in the main scanning direction on the basis of the predetermined data stored in said first storing means and an output signal from said NAND gate.

2. Equipment as claimed in claim 1, further comprising document reading means for reading a document, the input data being digital data produced by digitizing an output of said document reading means.

3. Equipment as claimed in claim 1, wherein the input data are tone data, said first storing means storing said tone data together with data necessary for magnification change processing, said equipment further comprising means for generating and outputting image data having tones in response to an output of said first storing means.

4. Equipment as claimed in claim 3, wherein a tone of the image data to be outputted is a tone of the image data which has undergone magnification change processing and which is determined on the basis of a plurality of nearby tone data.

5. An image forming apparatus having magnification changing means for executing magnification changing processing with input data in response to an input magnification change ratio, comprising:

first and second line memories for outputting data corresponding to an image to be reproduced;

magnification change ratio inputting means for inputting of a magnification change ratio by an operator which varies in a main scanning direction;

CPU means for receiving said magnification change ratio and for outputting data corresponding to said magnification change ratio;

first storing means for receiving said data output by said CPU means, storing predetermined data corresponding to magnification ratios represented by vectors offset from pixel locations of a document to be copied in order to determine locations of shifted pixels in the output image, said first storing means outputting said predetermined data; and a NAND gate for receiving, at first and second inputs thereof, a write clock signal and an output of said first storing means in order to control the timing of data output by said first and second line memories;

interpolation calculating means for generating an enlarged or reduced output image according to the predetermined data output by said first storing means by interpolating the predetermined data;

whereby image data are outputted with varying magnifications in the main scanning direction on the basis of the predetermined data stored in said first storing means and an output signal from said NAND gate.

6. The apparatus according to claim 5, wherein said magnification change ratio is entered using a stylus pen which allows the operator to enter position information corresponding to said magnification change ratio.

7. The image forming apparatus according to claim 5, wherein said first storing means receives instructions from a CPU for indicating the appropriate data to the output from said first storing means.

8. An image forming device having magnification changing means for executing magnification changing processing with input data in response to an input magnification change ratio, comprising:

first and second line memories for outputting data corresponding to an image to be reproduced;

magnification change ratio inputting means for inputting a magnification change ratio which is variable in a main scanning direction within a main scanning range;

CPU means for receiving said magnification change ratio and for outputting data corresponding to said magnification change ratio;

first storing means receiving said data output by said CPU means, storing predetermined data corresponding to magnification ratios represented by vectors offset from pixel locations of a document to be copied in order to determine locations of shifted pixels in the output image, said first storing means outputting said predetermined data;

a NAND gate for receiving, at first and second inputs thereof, a write clock signal and an output of said first storing means in order to control the timing of data output by said first and second line memories; and interpolation calculating means for generating an enlarged or reduced output image according to the predetermined data output by said first storing means by interpolating the predetermined data, wherein image data are output with a variable magnification change ratio in the main scanning direction based on the predetermined data stored in said first storing means and an output signal from said NAND gate.

9. A device according to claim 8, further comprising document reading means for reading a document, the input data being digital data produced by digitizing an output of said document reading means.

10. A device according to claim 8, wherein the input data are tone data, said first storing means storing said tone data together with said predetermined data, said device further comprising means for generating and outputting image data having tones in response to an output of said first storing means.

* * * * *